(12) United States Patent
Sekine

(10) Patent No.: US 7,302,183 B2
(45) Date of Patent: Nov. 27, 2007

(54) GAIN TILT COMPENSATORS AND THEIR SYSTEMS

(75) Inventor: Kenro Sekine, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 640 days.

(21) Appl. No.: 10/345,262

(22) Filed: Jan. 16, 2003

(65) Prior Publication Data

US 2003/0190166 A1    Oct. 9, 2003

(30) Foreign Application Priority Data

Apr. 5, 2002  (JP) .............................. 2002-103337

(51) Int. Cl.
H04J 14/02 (2006.01)
H04B 10/00 (2006.01)
(52) U.S. Cl. ........................................ 398/97; 398/173
(58) Field of Classification Search ............ 387/79–97, 387/140–201
See application file for complete search history.

(56) References Cited

U.S. PATENT DOCUMENTS

2002/0141044 A1* 10/2002 Sugawara et al. ..... 359/337.11

FOREIGN PATENT DOCUMENTS

| JP | 10-022924 | 1/1998 |
|---|---|---|
| JP | 11-224967 | 8/1999 |
| JP | 2000-252923 | 9/2000 |

OTHER PUBLICATIONS

Mitamura, N. et al., Flexibly Variable Spectrum Equalizer for Spectral Tilt Compensation, Optical Fiber Communication Conference 2000, paper WF2.
Hatayama, H., et al., Variable Attenuation Slope Compensator Using Silica-based Planar Lightwave Circuit Technology for Active Gain Slope Control in EDFAs, Optical Fiber Communication Conference 2000, paper WH7.

* cited by examiner

Primary Examiner—Shi K. Li
Assistant Examiner—David Lee
(74) Attorney, Agent, or Firm—Antonelli, Terry, Stout & Kraus, LLP.

(57) ABSTRACT

In the variable gain compensating apparatus, input power of optical amplifiers employed in respective optical repeaters is monitored, and the monitored input power is transferred to a down-stream side by using supervisor (SV) light. In a repeater equipped with a variable gain tilt compensator, input power monitor information of the optical amplifiers employed in the respective repeaters provided on the upper stream side is acquired from a supervisor signal. While utilizing a linear relationship established between a gain tilt of an optical amplifier and input power of the optical amplifier, the acquired input power monitor information is compared with a reference power value so as to calculate gain tilt amounts of the respective optical amplifiers. Then, the optimum gain tilt compensation amount of the variable gain tilt compensator is determined based upon the calculated gain tilt amounts.

16 Claims, 7 Drawing Sheets

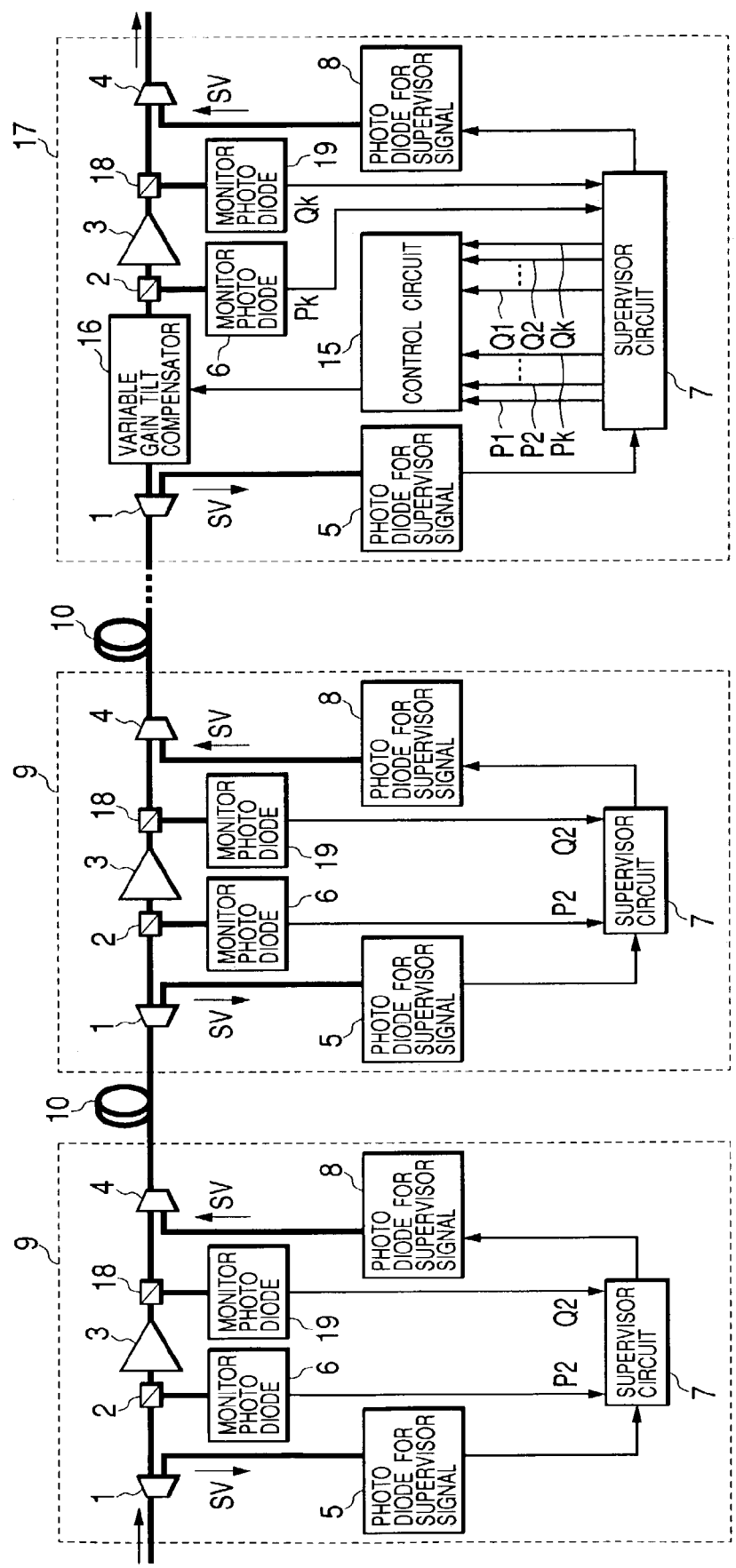

GAIN TILT COMPENSATORS AND THEIR SYSTEMS

BACKGROUND OF THE INVENTION

1. Field of the Invention

The present invention generally relates to a gain tilt compensator capable of compensating gain differences among wavelengths in wavelength division multiplexing (WDM) transmissions, and to a transmission system using the gain tilt compensator. More specifically, the present invention is directed to a control method of a variable type gain tilt compensator and to a transmission system using this variable type gain tilt compensator.

2. Description of the Related Art

In optical transmission systems, since optical signals are repeated/amplified by employing optical amplifiers without being converted into electric signals, cost-down aspects of long-distance transmission systems may be largely realized. As repeating/amplifying optical amplifiers of long-distance transmission systems, rare-earth-doped fiber amplifiers are mainly utilized at a present stage, while erbium-doped fiber amplifiers (simply abbreviated as "EDFA") are typically known. For example, in such an EDFA, since either pumping light having a wavelength of approximately 1480 nm or pumping light having a wavelength of approximately 980 nm is entered into an erbium-doped fiber (simply abbreviated as "EDF") into which erbium has been doped, optical signals having wavelengths defined from 1530 nm to 1620 nm can be amplified.

As a system capable of improving transmission capacity of an optical transmission system, the wavelength-division multiplexing (simply abbreviated as "WDM") system has been proposed. The WDM system corresponds to such a system in which optical signals having many wavelengths are multiplexed, and then, the multiplexed optical signals are transmitted into a fiber. In this WDM system, since a wavelength multiplexing number is increased, a total transmission capacity is improved in proportion thereto. Since the above-described optical amplifier is capable of repeating/amplifying these WDM signals without demultiplexing these WDM signals, the cost reduction effect achieved by employing the optical amplifier can be furthermore increased.

In the case that a WDM signal is repeated/transmitted by optical amplifiers, a major factor for limiting a transmission distance is a wavelength dependent characteristic (namely, gain tilt) of a gain owned by this optical amplifier. When gains of optical amplifiers are made different from each other in response to signals (wavelengths), a difference between output power of signals (wavelengths), and a difference between signal-to-noise ratios (SNR) are conducted. As a result, a difference between characteristics of received signals is conducted. Also, a so-called "non-linear response" phenomenon is present in an optical fiber, by which waveform distortions and noise are increased, depending upon optical power (intensity) of incident signals. As a consequence, the output power difference between the signals, which is conducted by the gain tilt of the optical amplifier, may appear as a difference between influences caused by non-linear responses of this optical fiber, and furthermore, a difference between characteristics of the received signals is enlarged.

To suppress a gain tilt of an optical amplifier, a gain tilt compensator may be effectively applied. Such a gain tilt of the optical amplifier is mainly caused by a wavelength dependent characteristic of an EDF itself, or wavelength dependent characteristics of losses of optical amplifier components (except for EDF). Under such a circumstance, a loss characteristic of a gain tilt compensator is designed in order to cancel the wavelength dependent characteristics of these optical devices, and this gain tilt compensator is installed in the optical amplifier, so that the gain tilt may be suppressed. The gain tilt compensator may be realized by such an optical passive element as a fiber-Bragg grating (FBG), a dielectric multi-layer film filter, an etalon filter, or a Mach-Zehnder interferometer (MZ interferometer) which is formed on a glass waveguide.

Since the above-described gain tilt corresponds to a so-termed "static gain tilt", namely the gain tilt amount does not depend upon a variation of either input signal power or pumping light power, the gain compensation can be performed by the above-explained fixed gain tilt compensator (namely, compensation amount is fixed). However, a dynamic gain tilt which is varied with respect to input signal power and/or pumping light power is contained in a gain tilt of an optical amplifier. There is a problem that this dynamic gain tilt cannot be compensated by the fixed gain tilt compensator.

FIG. 2 is a graphic diagram for representing a characteristic example of an amplifier output in the case that a 16-channel WDM signal is entered into an optical amplifier (EDFA). An automatic level control (simply abbreviated as "ALC") is carried out in this optical amplifier, by which an pumping power amount is automatically adjusted in such a manner that even when input power of this optical fiber is varied, total output power becomes a constant value. Since the ALC control is performed, a summation of all signal power, namely total signal power is kept constant even when the input power is varied. However, when the input power is varied, the respective signal power will behave in such a way that this input power may seesaw, so that a signal power difference between wavelengths will occur. For instance, in the case that an input of an amplifier is −15 dBm, an output (relative value) of this amplifier is equal to 0 dBm, namely, a constant value irrespective of the wavelengths, and thus, a flat output characteristic is obtained. However, when the amplifier input is increased to become −10 dBm, since a signal output on the short wavelength side is decreased and a signal output on the long wavelength side is increased, an output characteristic will own a so-called "right-tilt-up" trend. To the contrary, when the amplifier input is decreased to become −20 dBm, since a signal output on the short wavelength side is increased and a signal output on the long wavelength side is decreased, an output characteristic will own a so-called "right-tilt-down" trend.

In an actual repeat/transmission system, input power of an amplifier is determined based upon both output power of the amplifier and a span loss between repeaters (loss of transmission path). The span loss is fluctuated every span due to such factors as a fluctuation in loss coefficients of a fiber itself, a splice loss, a connector loss when optical fibers are connected to each other, and a fluctuation in fiber lengths. More specifically, in a repeat/transmission system used on the lands, since it is practically difficult to correctly arrange repeaters in an equal interval, span loss contains fluctuations defined from several (dB) to 10 (dB), or higher.

In general, when an optical amplifier is manufactured, the compensation amount of the above-described fixed gain tilt compensator is designed in such a manner that a flat optical output may be realized with respect to a certain reference input value. However, when a fluctuation of span losses happens to occur, even if a flat output characteristic may be realized in the fixed gain tilt compensator as to a reference span loss corresponding to a reference input, this fixed gain tilt compensator cannot maintain this flat output characteristic due to an occurrence of a dynamic gain tilt in such a case that an input power variation caused by the fluctuation of the span losses is produced. Therefore, there is a problem in the repeating/transmitting operations of the optical signals.

For instance, such a case is considered in which an optical amplifier having the characteristic of FIG. 2 is employed as a repeater. As indicated in FIG. 2, it is so assumed that the reference input power by which flat output power may be obtained is defined as −15 dBm, and also, the reference span loss corresponding to this reference input power is determined as 20 dB. Assuming now that a span interval within a certain repeating section becomes shorter than a reference value, and a span loss becomes 15 dB, the amplifier input is increased to become −10 dBm. As a consequence, the amplifier output owns a so-called "right-tilt-up" trend. If the shortest wavelength is used as a reference, then a gain tilt of approximately 1 dB will occur. On the other hand, it is so assumed that since a span interval within a certain repeating section becomes longer than the reference value, or since excessively large loss is produced due to splice connections and connector connections, resulting span loss becomes 25 dB. As a result, the amplifier input is decreased to become −20 dBm, so that the amplifier output owns a so-called "right-tilt-down" trend. If the shortest wavelength is used as the reference, then a gain tilt of approximately −1 dB will occur.

In order to suppress such a dynamic gain tilt depending upon input power, the use of such a variable gain tilt compensator whose compensation amount is variable may constitute an effective means. As a means for realizing such a variable gain tilt compensator, for instance, in a publication 1, the variable gain tilt compensating device is realized by employing the Faraday rotator and the birefrigent device. Also, in a publication 2, the variable gain tilt compensating device is realized by the Mach-Zehnder interferometer formed on the glass waveguide. In both the variable gain tilt compensating devices, since the loss gradients (slope) with respect to the wavelengths are variably set, the dynamic gain tilts of the optical amplifiers depending upon the input power, as represented in FIG. 2, are compensated.

(Publication 1: N. Mitamura, H. Nagaeda, N. Shukunami, and N. Naganuma, N. Fukushima, "Flexibly Variable Spectrum Equalizer for Spectral Tilt Compensation", Optical Fiber Communication Conference 2000, paper WF2)

(Publication 2: H. Hatayama, C. Hirose, K. Koyama, N. Akasaka and M. Nishimura, "Variable Attenuation Slope Compensator (VASC) Using Silica-based Planar Lightwave Circuit Technology for Active Gain Slope Control in EDFAs", Optical Fiber Communication Conference 2000, paper WH7)

However, in order that these variable gain tilt compensators are actually operated in transmission systems, the below-mentioned control circuit is necessarily required. That is, this control circuit monitors amounts of occurring gain tilts, and determines gain equalizing amounts so as to set actual compensation amounts of these variable gain tilt compensators.

In particular, in order to monitor the gain tilt amounts, as represented in FIG. 3(a), the following operations are necessarily required. That is, a portion of output power is split by an optical power splitter 101, and a WDM spectrum is monitored by using a spectrum monitor 102 such as a spectrum analyzer, and then, the monitored result must be transferred to a control circuit 103. Generally speaking, the spectrum monitor 102 is very expensive. Also, in order to actually install this spectrum monitor 102 into a repeat/transmission apparatus and a terminal station, various aspects to be considered are still left in practical use in vies of space, durability, and reliability.

While utilizing such a fact that the dynamic gain tilt depending upon the input power owns the linearity with respect to the wavelength (shown in FIG. 2), a relatively simple tilt amount monitor indicated in FIG. 3(b) has been proposed in JP-A-10-22924, or JP-A-11-224967. In this tilt amount monitor, a portion of the output power is split by the optical power splitter 101, and this split output power is demultiplexed by a demultiplexer 104 into an optical signal "λ1" on the short wavelength and another optical signal "λ2" on the long wavelength, and then, these optical signals are converted into information "P1" and "P2" which are direct proportional to the signal power by a monitor photodiode 105 and another monitor photodiode 106, respectively. The control circuit 103 compares the signal power information P1 and P2 with each other. Assuming now that the optical signal "λ1" on the short wavelength side is defined as a wavelength on the shorter wavelength side than a center (in the vicinity of 1554 nm) of the dynamic gain tilt characteristic shown in FIG. 2, whereas the optical signal "λ2" is defined as a wavelength on the longer wavelength side than the center, both a sign of the gain tilt and an absolute amount of inclinations of the gain tilts may be calculated by comparing the signal power information P1 and P2 with each other.

However, in these conventional techniques, a large number of optical components such as the optical demultiplexer 104 and the monitor photodiode 106 are required, which many increase cost of optical repeaters. Also, when the total quantity of these optical components is increased, splice steps are increased, and mounting areas of these optical components are increased, and further, total cost is increased.

SUMMARY OF THE INVENTION

An object of the present invention is to realize an apparatus with employment of a low-cost arrangement, capable of monitoring a gain tilt amount so as to control a variable gain tilt compensator.

In accordance with the present invention, such a transfer apparatus is provided. That is, in a WDM (wavelength division multiplexing) transmission system constituted by plural sets of optical repeaters and a variable gain tilt compensating apparatus connected to a down stream side, each of the optical repeaters is comprised of: means for monitoring input power of an optical amplifier; and means for transferring the monitored input power value to the down stream side; and a gain/wavelength dependent characteristic is predicted from the transferred input monitor values of the respective amplifiers; and then, a compensation amount of the variable gain tilt compensating apparatus is determined.

Also, in accordance with the present invention, in the above-explained arrangement, such a transmission apparatus is provided in which a gain/wavelength dependent characteristic is predicted based upon input monitor values (dB values) of the respective amplifiers by employing a linear calculation (linear function formula), and then, the compensation amount of the above-described variable gain tilt compensating apparatus is determined based upon this information.

Furthermore, according to the present invention, such a transmission apparatus is provided. That is, in a WDM transmission system constituted by plural sets of optical repeaters and a variable gain tilt compensating apparatus connected to a down stream side, each of the optical repeaters is comprised of: means for monitoring input power of an optical amplifier; and means for transferring the monitored input power value to the down stream side; and means for monitoring output power of the optical amplifier; and also means for transferring the monitored output power value to the down stream side. Then, a gain/wavelength dependent characteristic is predicted from the transferred input monitor values of the respective optical amplifiers, and a second gain/wavelength dependent characteristic is predicted from the transferred output monitor values of the respective optical amplifiers, so that a compensation amount of the variable gain tilt compensating apparatus is determined based upon these gain/wavelength dependent characteristics.

Other objects, features and advantages of the invention will become apparent from the following description of the embodiments of the invention taken in conjunction with the accompanying drawings.

BRIEF DESCRIPTION OF THE DRAWINGS

FIG. 10 is a block diagram for schematically indicating an arrangement of a transmission system according to a second embodiment of the present invention.

DETAILED DESCRIPTION OF THE EMBODIMENTS

Figure 1:
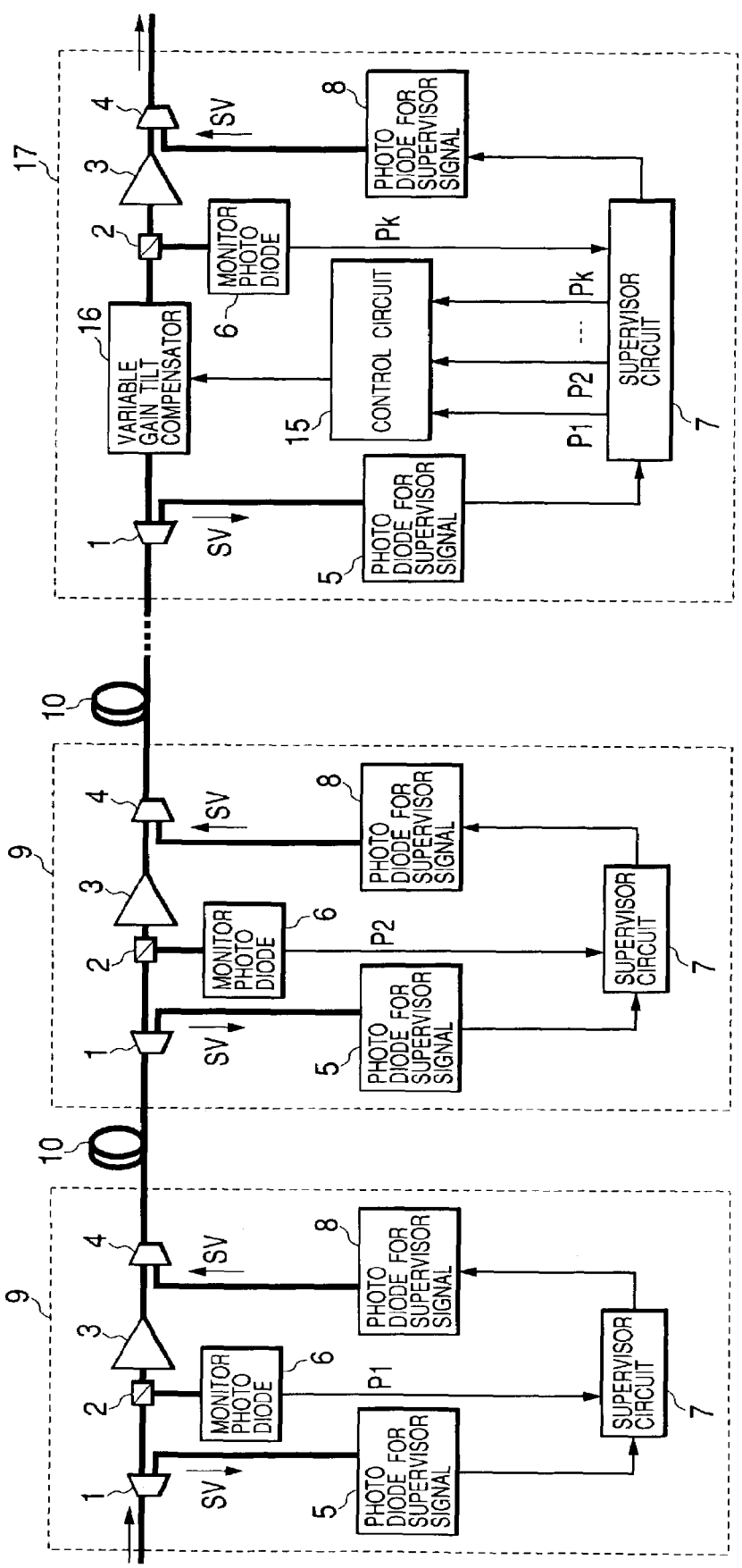
FIG. 1 is a diagram for schematically indicating an arrangement of a transmission system according to a first embodiment of the present invention.
Figure 2:
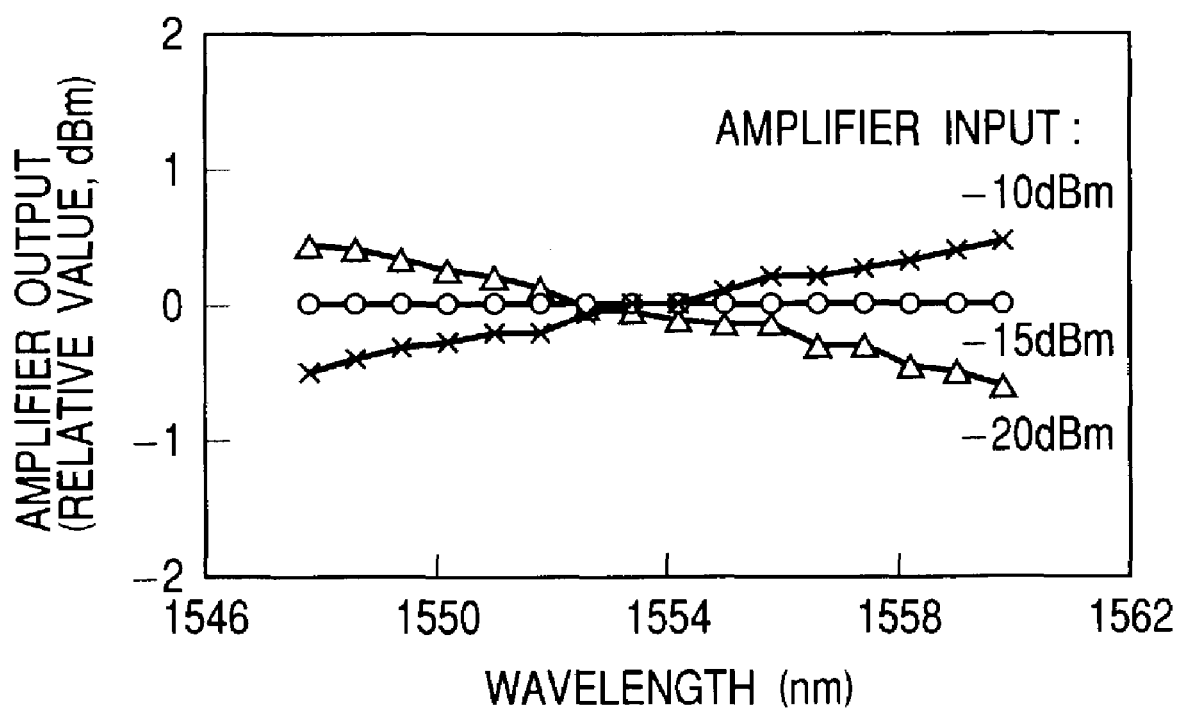
FIG. 2 is a graphic representation of an example of an output characteristic of an EDFA.
Figure 3A:
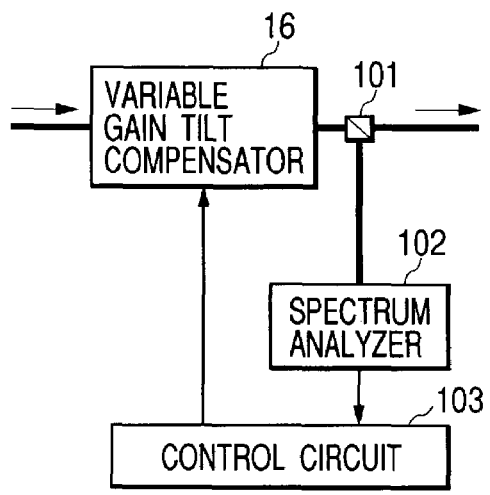
FIGS. 3(a) and 3(b) schematically indicate the monitors of the conventional gain tilt.
Figure 3B:
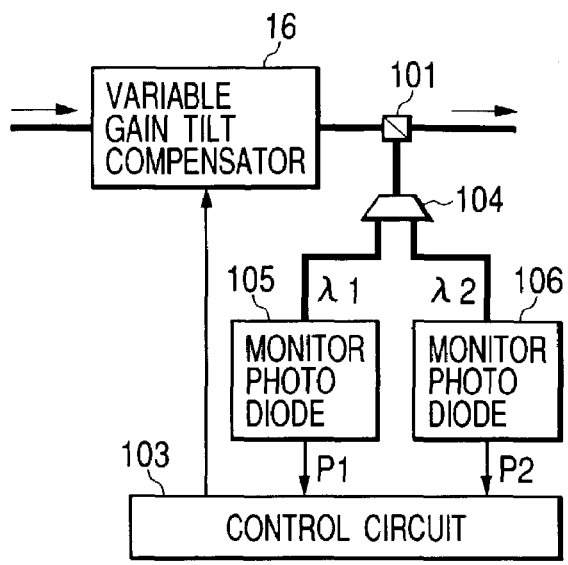

A first embodiment of the present invention will now be described with reference to FIG. 1. That is, a transmission system according to the first embodiment, shown in FIG. 1, is arranged by a repeater 9, an optical fiber 10, and a repeater 17 equipped with a gain tilt compensator.

In the repeater 9, both SV light (supervisor light) and WDM signal light are demultiplexed by a WDM demultiplexer 1 for supervisor signal, this SV light is converted into an electric signal by a photodiode 5 for supervisor light, and then, this electric signal is transferred to a supervisor circuit 7. Signal power of a portion of the WDM signal which has transmitted the WDM demultiplexer 1 for supervisor signal is split by an optical power splitter 2, and the split signal power is converted into an electric signal by a monitor photodiode 6. In other words, information P1 outputted from the monitor photodiode 6 corresponds to a signal which is direct proportional to an input power amount of an optical amplifier 3. The input monitor information P1 is transferred to the supervisor circuit 7. The supervisor circuit 7 adds the input monitor information P1 of the optical amplifier 3 to the information which is transferred from the upstream repeater, namely the output information from the above-described photodiode 5 for supervisor signal so as to form a new supervisor information signal, and sends out a new supervisor signal (supervisor light) from a laser diode 8 for supervisor signal. In a WDM multiplexer 4 for supervisor signal, the supervisor signal is multiplexed with the signal outputted from the optical amplifier 3. The multiplexed signal is outputted from the repeater 9.

Subsequently, in each of the repeaters 9, input monitor information P2, P3, - - - of the optical amplifier 3 are detected by the monitor photodiode 6, this detected input monitor information is superimposed on the supervisor signal, and then the superimposed monitor information signal is sent out to the down-stream repeater 9 in a manner similar to the above-described manner.

In the repeater 17 equipped with the gain tilt compensator, first of all, similar to other repeaters 9, a supervisor signal is demultiplexed by the WDM demultiplexer 1 for supervisor signal, and the supervisor information sent out from the repeater upstream 9 is transferred to the supervisor circuit 7. Also, similar to other repeaters 9, input monitor information Pk of the optical amplifier 3 is detected by the monitor photodiode 6, and then, the detected monitor information Pk is transferred to the supervisor circuit 7.

Next, in a control circuit 15, the supervisor circuit 7 acquires the input monitor information P1, P2, P3, - - - , Pk of the respective amplifiers 3 employed in the respective repeaters 9 and in the repeater 17 equipped with the gain tilt compensator. Then, the control circuit 15 calculates an optimum compensation amount of a variable gain tilt compensator 16 by predicting gain tilt amounts of the respective optical amplifiers 3 based upon the input monitor information P1, P2, P3, - - - , Pk, and thus, actually controls the variable gain tilt compensator 16.

A process sequence will now be described as follows, by which gain tilt amounts of the respective optical amplifiers 3 are predicted from the input monitor information P1, P2, P3, - - - , Pk.

In general, a gain "G(dB)" of an optical amplifier (EDFA) may be calculated based upon equation (1) of Expression 1:

[Expression 1]

$$G = (g + \alpha)nL - \alpha L \tag{1}$$

$$10^{P_t/10} = \sum_i 10^{P_i/10} \cdot 10^{[(g_i + \alpha_i)nL - \alpha_i L]/10} \tag{2}$$

$$b_i = g_i + \alpha_i \tag{3}$$

$$\Delta G = \frac{2(b_1 - b_n)}{b_1 + b_n} P_i + C \tag{4}$$

In the equation (1) of Expression 1, both an emission coefficient "g" and an absorption coefficient "α" (units of respective coefficients are "dB/m") correspond to physical parameters of an EDF (Erbium-Doped Fiber). A wavelength dependent characteristic of an EDFA (Erbium-Doped Fiber Amplifier) is expressed by these two physical parameters.

Figure 4:
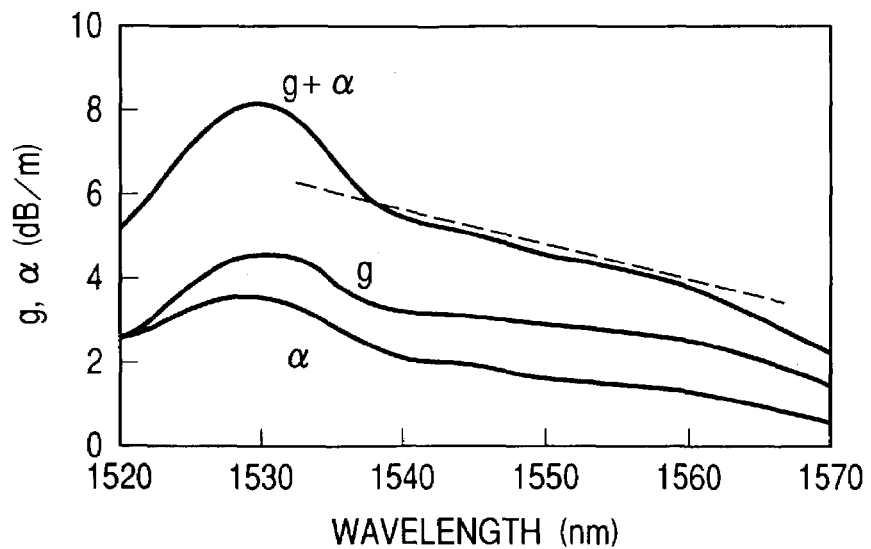
FIG. 4 is a graphic representation for representing an example of characteristics of physical parameters "g" and "α" of an EDF.

FIG. 4 indicates an example of characteristics as to the emission coefficient "g" and the absorption coefficient "α." Also, symbol "L" shows a length of the EDF (in unit of meter). Then, symbol "n" denotes normalized upper level population density within the EDFA, namely is such a coefficient for indicating that how many carriers have been excited in a laser upper level. Since the population density is normalized, this density value "n" is larger than, or equal to 0, and is smaller than, or equal to 1. Then, this normalized upper level population density "n" (will be referred to as "upper level population density" hereinafter) corresponds to such a value determined by both signal light power and pumping light power within the EDF. A variation of input power is amounted into a gain variation through this population density. For example, when input power is decreased, the upper level population density "n" is approximated to "1", and the EDFA is brought into a non-saturation condition (small signal condition), resulting in such a gain characteristic of a so-called "right-tilt-down" trend. Conversely, when input power is increased, the upper level population density "n" is approximated to "0", and the EDFA is brought into a saturation condition, resulting in such a gain characteristic of a so-called "right-tilt-up" trend.

Figure 5:
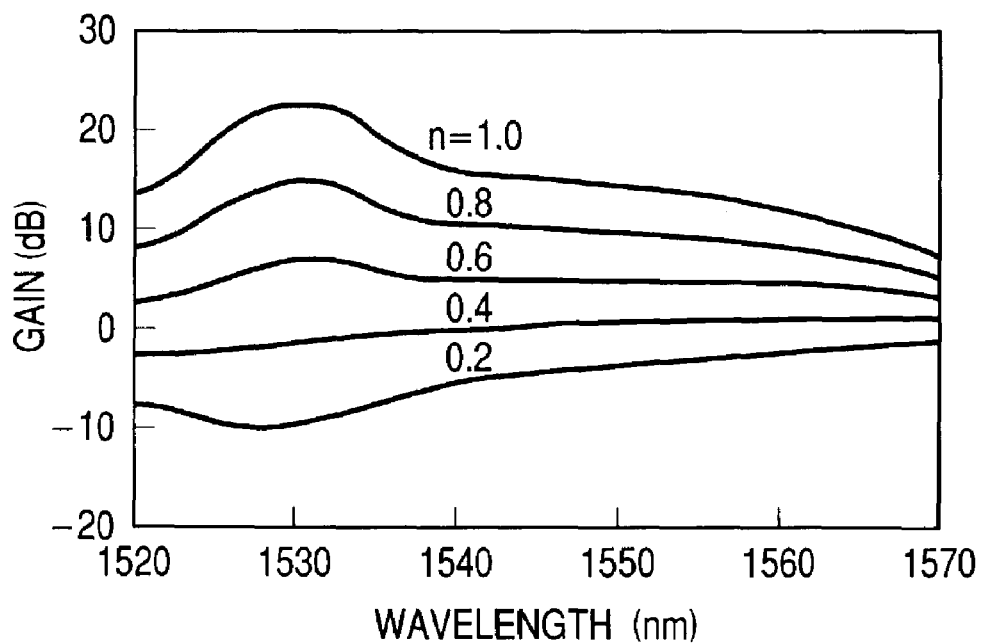
FIG. 5 graphically shows an example of numerical calculations of a dynamic gain tilt owned by the EDFA.

A numerical calculation example is given in FIG. 5 in which when a fiber length is selected to be 5 meters, a gain spectrum is calculated by employing the equation (1) of Expression 1. From FIG. 5, it is so monitored that a shape of the spectrum, namely a gain tilt is varied which may follow a variation of the upper level population density "n", namely a variation of input power. When an attention is again paid to the equation (1), since the second term is such a term which does not depend upon the upper level population density "n", it is so conceivable that a dynamic gain tilt which depends upon input power is direct proportional to the first term, namely a value of (g+α).

Next, in order to calculate a gain tilt "G(λ)" contained in the EDFA under a certain state, the above-described upper level population density "n" must be calculated. In order to calculate the upper level population density "n", a rate equation is described as to each of signal light, pumping light, and further noise light. Then, simultaneous equations as to these described rate equations must be solved. In general, a numerical analysis must be carried out. However, in the case that total output power of the EDFA is controlled (ALC control) to become constant, the upper level population density "n" may be simply calculated.

An equation (2) of Expression 1 corresponds to an equation indicative of a relationship between input power and output power in the EDFA in which the ALC control is carried out. Symbol "Pt(dBm)" shows total output power of the EDFA, and since the ALC control is performed, this total output power is a constant value. Symbol "Pi(dBm)" indicates input power per a signal of the EDFA, and a suffix "I" of this symbol indicates a signal number. Assuming now that a total multiplexing WDM number (signal number) is "M", I=1, 2, - - - , M. Also, symbols "gi" and "αi" represent an emission coefficient and an absorption coefficient in an i-th signal wavelength.

As shown in FIG. 4, it is so assumed that a value of (g+α) is approximated to be linear with respect to a wavelength, and this value is expressed by "b" as in an equation (3) of Expression 1 for the sake of simple explanations. Also, it is so assumed that the input power "Pi" is constant irrespective of a wavelength, namely an input WDM signal is flat with respect to a wavelength. Based upon the above-described assumption, both the value "(g+α)" and the value "α" contained in the equation (2) are approximated in the linear manner, and also, this equation (2) is solved in an analysistic manner so as to obtain an approximation value of the upper level population density "n", and then, this approximation value is substituted for the upper level population density "n" of the equation (1). As a result, in the case of the n-wavelength multiplexing operation, a gain difference "ΔG=Gn−G1" between an n-th signal equal to the longest wavelength and a first signal equal to the shortest wavelength may be expressed by an equation (4). A second term "C" of this equation (4) is such a value which is determined by both the emission coefficient "g" and the absorption coefficient "α", and this second term "C" is a constant value with respect to the input power "Pi."

The equation (4) implies that the gain tilt "ΔG(dB)" owns a linear relationship with respect to the input power Pi(dB).

Figure 6:
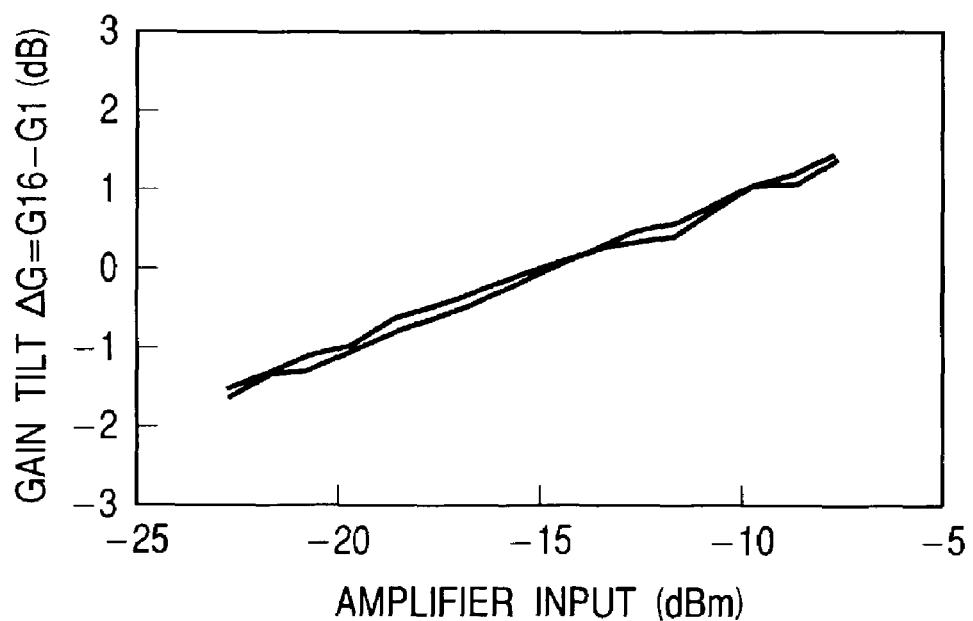
FIG. 6 graphically indicates a measuring example of a relationship between gain tilts and inputs of the amplifier.

For instance, FIG. 6 is a graph for graphically showing a relationship of a gain tilt "ΔG=G16−G1" with respect to an input of the amplifier. That is, FIG. 6 indicates actually measured values which have been evaluated by an EDFA manufactured by employing an EDF having such a characteristic of FIG. 4. From this graph, the following facts can be revealed. That is, a variation amount of the gain tilt with respect to the amplifier input is nearly equal to a gain tilt variation of 0.2 dB with respect to an amplifier input variation of 1 dB. Also, the gain tilt owns a linear relationship with respect to the amplifier input.

On the other hand, when a value of (g+α) is read out from the graph of FIG. 4, this value becomes 7.55 dB/m in the first signal (wavelength=1547.72 nm), and becomes 9.64 dB in the 16-th signal (wavelength=1559.79 nm). When these numeral values are substituted for an equation (4) of Expression 1, a variation of the gain tilt with respect to the amplifier input variation of 1 dB may be calculated as 0.20 dB, and it is so confirmed that this calculated variation value is made coincident with the actually measured value.

As previously explained, the linear relationship is established between the input power Pi(dB) and the gain tilt ΔG(dB). As a consequence, while the arrangement of the transmission system of the present invention shown in FIG. 1 is employed, the gain tilt amounts of the respective optical amplifiers 3 can be predicted from the input monitor information P1, P2, P3, - - - , Pk. Accordingly, since the input monitor information P1, P2, P3, - - - , Pk is collected to the control circuit 15 so as to predict the gain tilt amounts of the respective optical amplifiers 3, an optimum gain compensation amount of the variable gain tilt comparator 16 may be calculated and may be set.

In accordance with the present invention, the monitor means of the input optical power is diverted to the monitor means of the gain tilt amount. The monitor means of the input optical power may be realized by employing only the low-cost optical power splitter 2 and a single monitor photodiode 6 without requiring a high-cost WDM demultiplexer and a plurality of monitor photodiodes. Also, among many of optical transmission systems, in order to control, or supervise the transmission systems, input monitor means have already been installed in repeaters irrespective of such a condition as to whether or not variable gain compensation functions are provided. As a consequence, since these means are diverted to the high-cost WDM demultiplexers, the gain tilt amounts can be monitored without additionally and newly employing optical components.

Also, in accordance with the present invention, an object of this invention is to reduce a total installation number of variable gain tilt compensators, and while these variable gain tilt compensators are not provided in all of the repeaters, these variable gain tilt compensators are provided with only a part of these repeaters in a distribution manner. In this case, the gain tilts of the repeaters 9 must be remotely monitored from the repeater 17 with gain tilt compensator. However, since the input monitor information P1, P2, P3, - - -, Pk of the respective optical amplifiers is transferred by using the supervisor light, the gain tilts may be monitored in a batch manner in the repeater 17 equipped with gain tilt compensator. Also, among many optical transmission systems, these transmission systems own an object to supervise the transmission systems, both the transfer functions and the transfer means of the input monitor information by way of the supervisor light have already been installed irrespective of such a fact as to whether or not the variable gain tilt compensation function is provided. As a result, since these means are diverted, the gain tilt amounts may be remotely monitored without newly adding either optical components or both a supervisor light demodulation circuit and a supervisor light modulation circuit.

As a consequence, in accordance with the present invention, the gain tilt amounts may be monitored by the very low-cost arrangement, and thus, the variable gain tilt compensator can be controlled.

Figure 7:
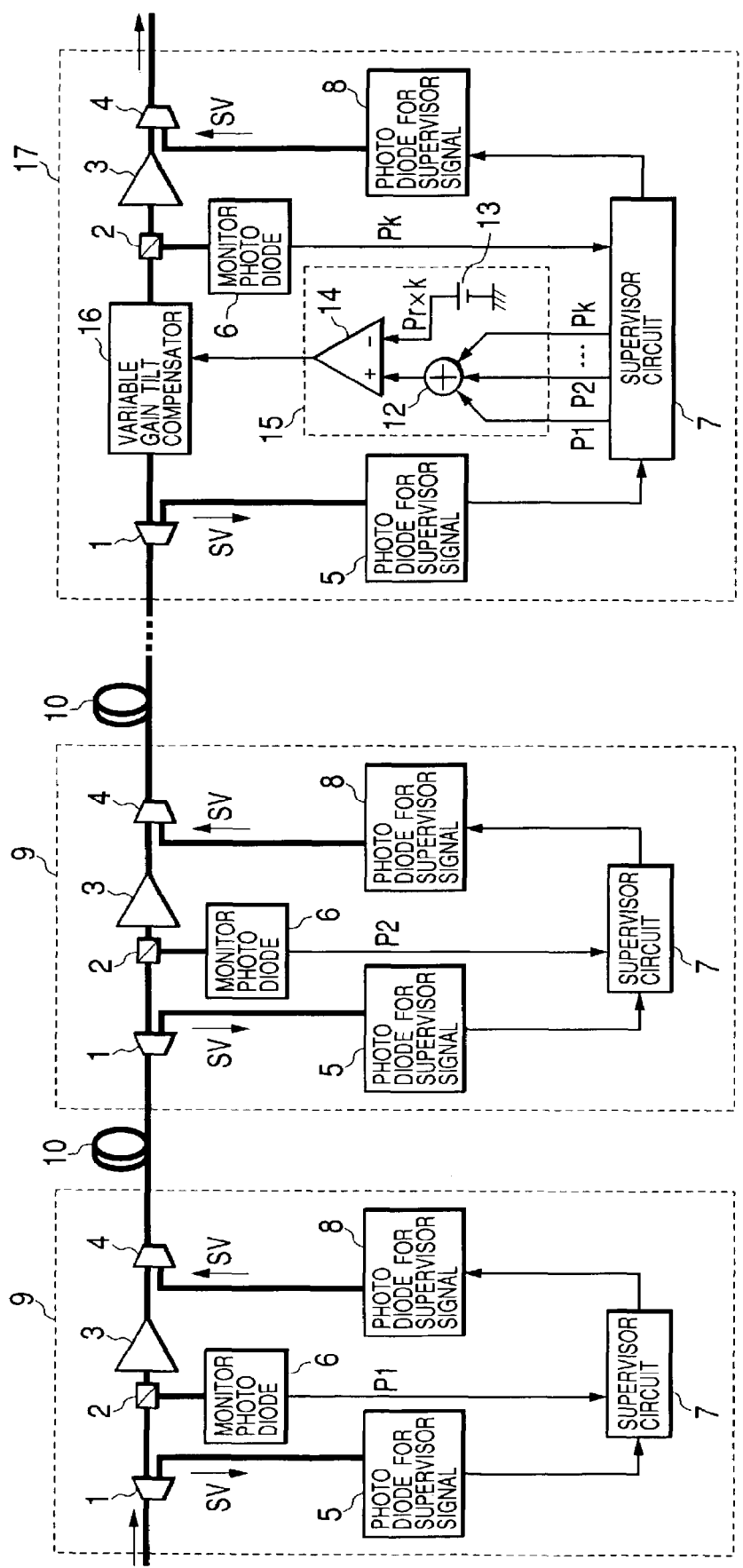
FIG. 7 is a diagram for schematically representing a structural example of a gain tilt compensator control circuit according to a first embodiment of the present invention.

FIG. 7 is an example for indicating an embodiment mode of more concrete structure as to the control circuit 15 contained in the repeater 17 with gain tilt compensator shown in the first embodiment of the present invention.

In the repeater 17 with gain tilt compensator, the input monitor information P1, P2, P3, - - -, Pk of the respective optical amplifiers 3 is transferred from the supervisor circuit 7 to the control circuit 15. The input monitor information P1, P2, P3, - - -, Pk corresponds to values which are direct proportional to the input power (dB values) of the respective optical amplifiers 3. In the control circuit 15, a decibel addition circuit 12 firstly adds the input monitor information P1, P2, P3, - - -, Pk to each other so as to obtain a decibel summation.

In a reference voltage generator 13, a value is generated by multiplying a reference voltage value "Pr" by an amplifier number "k." In this case, the amplifier number "k" corresponds to a total number of optical amplifiers which are contained in the repeater 9 for generating the gain tilt to be compensated and the repeater 17 with gain tilt compensator. This amplifier number "k" is identical to the maximum suffix number "k" of the input monitor information P1, P2, P3, - - -, Pk. Also, the reference voltage value "Pr" corresponds to such an input monitor information sensed by the monitor photodetector 6 in the case that the reference input power is entered into the optical amplifier 3, and this reference input power is designed in such a manner that the optical amplifier 3 may realize a flat gain characteristic. Simply speaking, this reference level value "Pr" corresponds to such an input monitor information when the flat output may be realized.

An accumulated gain tilt amount in the case that repeaters are connected in a multi-stage manner may be calculated based upon the decibel summation of the respective gain tilt amounts if a hole-burning effect of gains is neglected. As a consequence, both the decibel summation of the input monitor information and the reference power value Pr×n are entered into a comparator 14 so as to calculate a difference between them, and the input power variation amount is converted into the gain tilt amount by employing the equation (4) of Expression 1, so that the accumulated gain tilt amount may be calculated. As a result, the optimum gain tilt compensation amount of the variable gain tilt compensator 16 may be calculated, and may be set.

As a device which constitutes the variable gain compensator 16 of the present invention, such a variable gain compensation device formed by employing the above-described Faraday rotator and birefrigent device may be applied. Alternatively, a Mach-Zehnder interferometer formed by a glass waveguide may be applied. As a material of a Mach-Zehnder interferometer, the present invention is not limited to a glass waveguide, but a polymer waveguide, a semiconductor waveguide, and the like may be applied. Also, an EDFA itself may be employed as the variable gain tilt compensator 16, and further, other rare-earth-doped fiber amplifiers, a semiconductor amplifier, a fiber Raman amplifier, and the like may be employed. Alternatively, an acoustic-optic tunable filter may be employed. Also, even in such a case that either mechanical effects or thermal effects are applied to a fixed type gain tilt compensator so as to form a variable gain tilt compensator, this formed variable gain tilt compensator may be employed as the variable gain tilt compensator 16 of the present invention. As the fixed type gain tilt compensator, there are provided a fiber Bragg grating, a dielectric multi-layer film filter, and an etalon filter.

In the present invention, either the supervisor signal or the supervisor light has been employed as the transfer employed as the transfer means of the input monitor information P1, P2, P3, - - -, Pk. Alternatively, even when other transfer means such as a new optical signal and a wireless signal is employed, the optical transmission system of the present invention may be realized without employing the supervisor signal, or the supervisor light of the optical transmission system.

Figure 8:
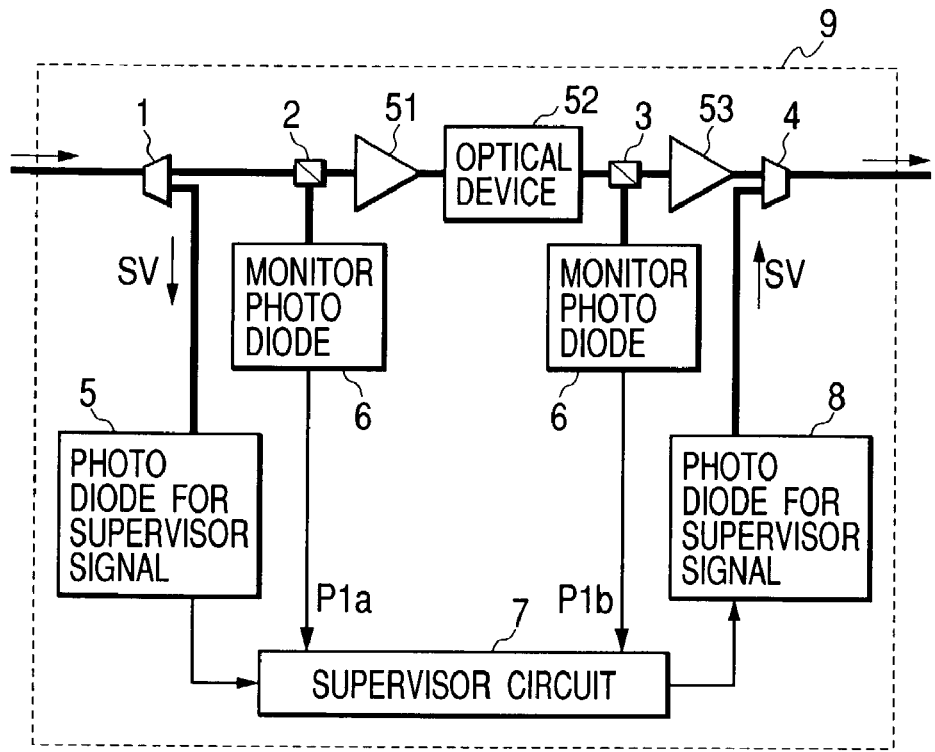
FIG. 8 schematically shows an example in which the gain tilt compensator of the present invention is applied to a two-staged amplifier.

In the description of the present invention, such a case that one optical amplifier 3 is mounted on each of the repeaters 9 has been considered. Alternatively, even in such a case that optical amplifiers are mounted on either the respective repeaters or a portion of these repeaters in a multi-stage manner, the present invention may be applied thereto. For example, as shown in FIG. 8, while an amplifier is constituted by two stages, namely, a preamplifier 51 and a post amplifier 53, even in such a case that an optical device 52 such as a dispersion compensation device is inserted into a midstage between the preamplifier 51 and the post amplifier 53, since both input monitor information P1a and P1b are acquired by the monitor photodiodes 6 in both the preamplifier 51 and the post amplifier 53, not only a dynamic gain tilt of the preamplifier 51 may be compensated, but also a dynamic gain tilt of the post amplifier 53 may be compensated which is caused by an output variation of the preamplifier 51 and a loss variation of the optical device 52.

Similarly, multi-staged amplifiers may also be applied even in the repeater 17 with gain tilt compensator. Also, even when the variable gain tilt compensator 16 is installed at an output stage of an amplifier, or an intermediate stage within the multi-staged amplifiers, the present invention may be applied.

In the arrangement of the present invention indicated in FIG. 7, the decibel summation of the input monitor information P1, P2, P3, - - -, Pk is compared with the reference voltage value. Alternatively, even if the input monitor information P1, P2, P3, - - -, Pk is compared with the reference voltage value, and there-after a decibel summation thereof is calculated, then a similar effect may be obtained. Also, even when the comparisons between the input monitor information P1, P2, P3, - - -, Pk and the reference power value are carried out in the respective repeaters, and there-after information as to this comparison difference is transferred by a supervisor signal, a similar effect may be achieved.

In the above-described explanation, while the transmission system within such a wavelength band that the value of "g+α" of FIG. 4 can be linearly approximated with respect to the wavelength has been assumed, the discussions have been made in that both the gain tilt and the gain compensation amount are linearly approximated to the wavelength. However, the present invention may be applied to a transmission system even in such a wavelength range that the value of "g+α" of FIG. 4 cannot be linearly approximated to the wavelength.

Figure 9:
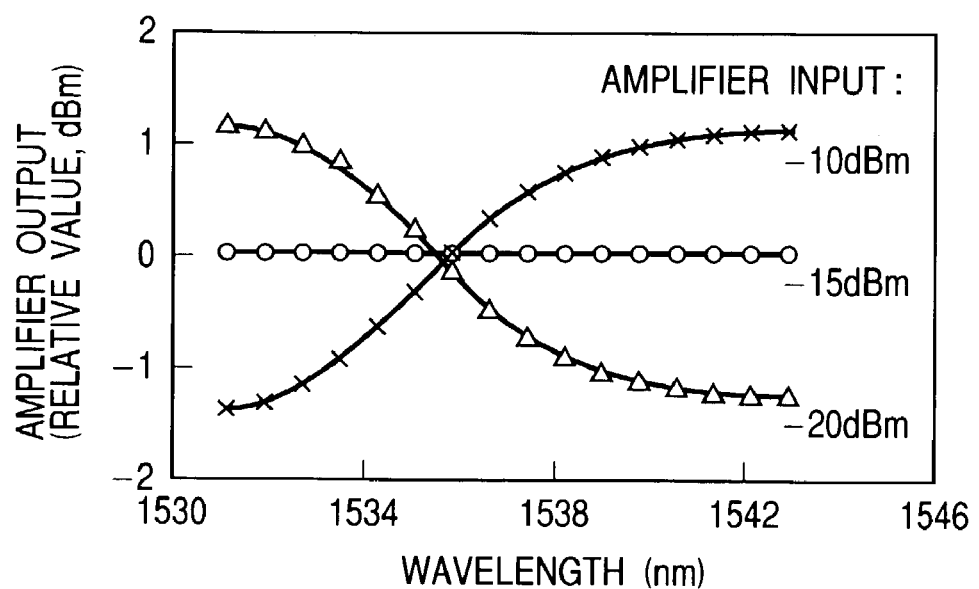
FIG. 9 graphically representing an example of an output characteristic of the EDFA in a blue band.

As previously described, in accordance with the equation (1) of Expression 1, it is so conceivable that the dynamic gain tilt is direct proportional to the value of "g+α". For instance, when considering an application of the EDFA to such a wavelength range defied from 1530 nm up to approximately 1545 nm, namely in the vicinity of a so-called "blue band", such a prediction may be made. That is, the gain tilt is not equal to a straight line, but may become a sinusoidal shape. When numerical values of gain tilts produced from the characteristic of FIG. 4 are calculated, for instance, such a result as indicated in FIG. 9 may be obtained. In this case, as to a gain tilt, similar to the above-described case, the gain tilt "ΔG" is defined by the gain difference "G16−G1 (dB)" between the longest wavelength and the shortest wavelength, so that the gain tilt ΔG (dB) may be expressed by a linear relationship with respect to the input power Pi (dB). As a consequence, the gain tilt amount may be calculated from the input monitor information. The following attention should be paid. That is, as shown in FIG. 9, within this wavelength range, since the gain tilt does not become a straight line with respect to the wavelength but becomes a sinusoidal-like shape, such a device having a similar shape may be desirably selected as the variable gain compensator 16 to be used. For example, a sinusoidal loss shape may be realized by setting a period of a wavelength characteristic of a Mach-Zehnder interferometer to approximately two times of a transmission wavelength range.

In the above-described example, the discussion has been made in a so-called "blue band." However, this discussion may be similarly made even in other wavelength bands, in which the gain tilt ΔG (dB) may be expressed by a linear relationship with respect to the input power Pi (dB), and the gain tilt may be calculated from input monitor information.

In the above-described embodiment, as the optimum gain tilt compensation amount of the variable gain tilt compensator 16, while the gain tilt amount calculated in the control unit 15 is offset, the compensation amount has been determined based upon the output of the repeater 17 with variable gain tilt compensator in such a manner that the WDM signal becomes flat. However, there are certain possibilities when optical transmission systems are operated and are designed, in which an excessively large gain tilt compensation amount is wanted to be set by considering a wavelength characteristic, a gain tilt, and an influence caused by a non-linear type phenomenon of a optical fiber, which are located on the down-stream side of this repeater 17 with gain tilt compensator. If such a calculation algorithm has been previously set, then a gain tilt may be calculated and an optimum gain tilt compensation amount may be set by employing this calculation algorithm.

FIG. 10 is a diagram for schematically showing an arrangement of an optical transmission system according to a second embodiment of the present invention. In a repeater 9, both SV light (supervisor light) and WDM signal light are demultiplexed by a WDM demultiplexer 1 for supervisor light, this SV light is converted into an electric signal by a photodiode 5 for supervisor light, and then, this electric signal is transferred to a supervisor circuit 7. Signal power of a portion of the WDM signal which has transmitted the WDM demultiplexer 1 for supervisor signal is split by an optical power splitter 2, and the split signal power is converted into an electric signal by a monitor photodiode 6. In other words, information P1 outputted from the monitor photodiode 6 corresponds to a signal which is direct proportional to an input power amount of an optical amplifier 3.

Also, signal power of a portion of an output signal from an optical amplifier 3 is split by an output-sided optical power splitter 18, and then, this split signal is converted into an electric signal by a monitor photodiode 19. In other words, information "Q1" outputted from the monitor photodetector 19 corresponds to a signal which is direct proportional to the output power amount of the optical amplifier 3.

Both the input monitor information P1 and the output monitor information Q1 are transferred to a supervisor circuit 7. The supervisor circuit 7 adds both the input monitor information P1 of the optical amplifier 3 and the output monitor signal Q1 to the information which is transferred from the upstream repeater, namely the output information from the above-described photodiode 5 for supervisor signal so as to form a new supervisor information signal, and sends out a new supervisor signal (supervisor light) from a laser diode 8 for supervisor signal. In a WDM multiplexer 4 for supervisor signal, the supervisor signal is multiplexed with the signal outputted from the optical amplifier 3. The multiplexed signal is outputted from the repeater 9.

Subsequently, in each of the repeaters 9, input monitor information P2, P3, - - - of the optical amplifier 3 are detected by the monitor photodiode 6, and also, output monitor information Q2, Q3, - - - , of the optical amplifier 3 are detected. Then, both this input monitor information and the output monitor information are superimposed on the supervisor signal, and then the superimposed monitor information signal is sent out to the downstream repeater 9.

In a repeater 17 equipped with a gain tilt compensator, first of all, similar to other repeaters 9, a supervisor signal is demultiplexed by the WDM demultiplexer 1 for supervisor signal, and the supervisor information sent-out from the upstream repeater 9 is transferred to the supervisor circuit 7. Also, similar to other repeaters 9, both input monitor information Pk and output monitor information Qk of the optical amplifier 3 are detected by the monitor photodiode 6, and then, the detected input/output monitor information Pk/Qk are transferred to the supervisor circuit 7.

Next, in a control circuit 15, the supervisor circuit 7 acquires the input monitor information P1, P2, P3, - - - , Pk of the respective amplifiers 3 and the output monitor information Q1, Q2, Q3, - - - , Qk thereof employed in the respective repeaters 9 and in the repeater 17 equipped with gain tilt comparator. Then, the control circuit 15 predicts gain tilt amounts of the respective optical amplifiers 3 based upon these input monitor information P1, P2, P3, - - - , Pk.

Also, the control circuit 15 predicts a second gain tilt amount from the output monitor information Q1, Q2, Q3, - - - , Qk. In this case, this second gain tilt amount corresponds to a gain tilt amount which is caused by Raman amplification between channels.

Due to an influence of stimulated Raman scattering corresponding to a non-linear phenomenon of an optical fiber, when a signal of excessively high power is entered into the optical fiber, power movement will occur from a signal on the side of shorter wave-length to a signal on the side of longer wavelength. This power movement is called as a Raman amplification effect. In the case of a WDM signal, a Raman amplification between signals will occur, and since signal power on the shorter wavelength side is converted into signal power on the longer wavelength side, a right-tilt-up phenomenon will occur.

The gain tilt amount which is caused by the Raman amplification between channels is given by an equation (5) of Expression 2:

[Expression 2]

$$\Delta G = \frac{g_r}{2A_{eff}} L_{eff} P_o B \times 10 \cdot \log_{10} e \quad (5)$$

In the equation (5), symbol "gr" indicates a gradient of a Raman gain efficiency within a signal range, and, for example, is equal to approximately $5\times 10^{-27}$ (10 to the −27th power) (m/W/Hz) in SMF. Symbol $P_0$(W) shows fiber incident power, symbol "Aoff" denotes an effective sectional area of the fiber, symbol "Leff(m)" represents an effective length of the fiber, and symbol B(Hz) represents a WDM signal range. Since the equation (5) is employed, the second gain tilt amount may be calculated which is caused by the Raman amplification between channels based upon the various sorts of fiber parameters, and the fiber incident power, namely, the amplifier output power.

As a consequence, since the gain tilt amounts of the optical amplifiers 3 are predicted based upon the input monitor information P1, P2, P3, - - - , Pk, and on the other hand, the second gain tilt amount caused by the Raman amplification between channels is predicted based upon the output monitor information Q1, Q2, Q3, - - - , Qk, an actual gain tilt amount can be predicted in high precision, and thus, an optimum gain tilt compensation amount of the variable gain tilt compensator 16.

In accordance with the present invention, the monitor means of the output optical power is diverted to the monitor means of the second gain tilt amount. The monitor means of the output optical power may be realized by employing only the low-cost optical power splitter 18 and a single monitor photodiode 19 without requiring a high-cost WDM demultiplexer and a plurality of monitor photodiodes. Also, among many of optical transmission systems, these transmission systems own such an object to control, or supervise the transmission systems, and input monitor means have already been installed in repeaters irrespective of such a condition as to whether or not variable gain compensation functions are provided. As a consequence, since these means are diverted to the high-cost WDM demultiplexers, the second gain tilt amounts can be monitored without additionally and newly employing optical components.

As previously explained, in accordance with the present invention, while the high-cost spectrum monitor means, or the high-cost WDM demultiplexer and the new optical components are not additionally required, the dynamic gain tilt amount which is caused by the input dependent characteristic of the EDFA can be calculated, and thus, the variable gain tilt compensating apparatus with employment with the low-cost arrangement can be realized.

Also, in accordance with the present invention, while the high-cost spectrum monitor means, or the high-cost WDM demultiplexer and the new optical components are not additionally required, the second gain tilt amount which is caused by the Raman amplification between channels can be calculated, and thus, the variable gain tilt compensating apparatus with employment with the low-cost arrangement can be realized.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A WDM (wavelength division multiplexing) transmission system comprising:
    one or more optical repeaters; and
    a variable gain tilt compensator,
    wherein said variable gain tilt compensator is installed at an output side of any of said one or more optical repeaters along an optical transmission path,
    wherein each of said optical repeaters includes:
        means for monitoring input power and outputting values corresponding to the monitored input power, the value being expressed by decibels; and
        means for transferring the monitored input power value received from an upstream side optical repeater and the output value to one of a subsequent optical repeater and the variable gain tilt compensator along the optical transmission path,
    wherein said variable gain tilt compensator calculates a gain tilt using a linear function formula having the respective monitored input power values of said optical repeaters, through which optical signals have been passed, as input variables and determines compensation amount; and
    wherein the linear function formula used to calculate the pain tilt is in the form of:

$$\Delta G = \sum_{i=1}^{n} G_i = (2(b_1 - b_n)/(b_1 + b_n)) \sum_{i=1}^{n} P_i + C$$

where:
    $\Delta$ G is the gain tilt
    $P_1$: the monitored input power value from the i-th repeater,
    $b_1 = g_i + a_i$
    g is an emission coefficient (dB/m),
    α a is an absorption coefficient (dBIm),
    C is a Constant, and
    n is a number of repeaters for which the monitored input power values are input to said variable gain tilt compensator.

2. The WDM transmission system as claimed in claim 1 wherein:
    the transferring means transfers the monitored input power value and the value received from the upstream side repeater as either en apparatus supervisor signal or apparatus supervisor light.

3. The WDM transmission system claimed in claim 1 wherein:
    a dispersion compensation device is inserted into either a portion or all of said optical repeaters;
    the dispersion compensation device includes means for monitoring either one or both of power input to the dispersion compensation device and output from the dispersion compensation device and outputting either one or both monitored input power value and monitored output power value; and said compensation amount of the variable gain tilt compensator is determined based upon said values including said monitored input power value and said monitored output power value.

4. The WDM transmission system as claimed in claim 1 wherein:
a wavelength dependent characteristic of said variable gain tilt compensator owns a linear relationship with respect to a wavelength.

5. The WDM transmission system as claimed in claim 1 wherein:
a wavelength dependent characteristic of said variable gain tilt compensator owns a sinusoidal characteristic with respect to a wavelength, and a time period of a sinusoidal wave is two times, or more longer than a transmission band.

6. The WDM transmission system as claimed in claim 1 wherein:
a wavelength dependent characteristic of said variable gain tilt compensator is a characteristic which is direct proportional to a summation between an emission coefficient "g" (dB/m) and an absorption coefficient "$\alpha$" (dB/m), and a value of "g+$\alpha$", which correspond to a physical parameter of an EDF (erbium-doped fiber).

7. The WDM transmission system as claimed in claim 1 wherein:
said variable gain tilt compensator is a compensator which is constituted by employing both a Farady rotator and a birefringent device.

8. The WDM transmission system as claimed in claim 1 wherein:
said variable gain tilt compensator is a compensator which is constituted by a Mach-Zehnder Interferometer formed on a glass waveguide, a polymer waveguide, or a semiconductor waveguide.

9. The WDM transmission system as claimed in claim 1 wherein:
said variable gain tilt compensator is a compensator which is constituted by an acoustic-optic filter.

10. The WDM transmission system as claimed in claim 1 wherein:
said variable gain tilt compensator is a compensator which is constituted by a rare-earth-doped fiber amplifier.

11. The WDM transmission system as claimed in claim 1 wherein:
said variable gain tilt compensator is a compensator which is constituted by a semiconductor amplifier.

12. The WDM transmission system as claimed in claim 1 wherein:
said variable gain tilt compensator is a compensator which is constituted by a fiber Raman amplifier.

13. The WDM transmission system as claimed in claim 1 wherein:
said variable gain tilt compensator is a compensator which is constituted by a tunable fiber Bragg grating.

14. The WDM transmission system as claimed in claim 1 wherein:
said variable gain tilt compensator is a compensator which is constituted by a tunable dielectric multi-layer film filter.

15. The WDM transmission system as claimed in claim 1 wherein:
said variable gain tilt compensator is a compensator which is constituted by a tunable etalon filter.

16. The WDM transmission system as claimed in claim 1 wherein:
said variable gain tilt compensator is a compensator which is constituted by a tunable fiber type Mach-Zehnder interferometer.

* * * * *